United States Patent [19]
Bergman

[11] Patent Number: 6,136,267
[45] Date of Patent: Oct. 24, 2000

[54] FUEL IGNITION ARRESTER SYSTEM AND METHOD

[75] Inventor: Jacob Bergman, White Plains, N.Y.

[73] Assignee: Bergman Consulting Engineers, New York, N.Y.

[21] Appl. No.: 09/138,980

[22] Filed: Aug. 24, 1998

Related U.S. Application Data

[63] Continuation-in-part of application No. 09/084,528, May 26, 1998, abandoned.

[51] Int. Cl.[7] ..................................................... C01F 13/00
[52] U.S. Cl. ........................... 422/41; 44/540; 244/129.2; 244/135 R; 261/18.4; 261/DIG. 2; 422/2; 422/3; 422/105; 422/107; 422/110
[58] Field of Search ............................... 422/2–4, 25, 40, 422/41, 105, 107, 108, 110, 111, 117, 119, 163, 306; 44/540; 244/128, 129.25, 135 R; 261/DIG. 2, DIG. 21, DIG. 66, DIG. 83, 18.4

[56] References Cited

U.S. PATENT DOCUMENTS

| | | |
|---|---|---|
| 2,757,744 | 8/1956 | Malone ....................................... 169/47 |
| 3,692,823 | 9/1972 | Gordon . |
| 5,224,550 | 7/1993 | Bragg ........................................ 169/62 |

*Primary Examiner*—Krisanne Thornton
*Attorney, Agent, or Firm*—Ohlandt, Greeley, Ruggiero & Perle, L.L.P.

[57] ABSTRACT

A fuel ignition arrester system that has a feedback control to maintain the fuel/air mixture in the ullage of a fuel tank above the flammability range. The system uses a photoelectric detector to signal when the fuel/air mixture concentration falls or rises to a predetermined concentration value. The predetermined value is selected to be higher than the upper limit of the flammability range so that the fuel/air mixture is maintained above the range and, thus, incombustible. A fuel pump and piping system with nozzles is arranged to inject fuel into the ullage when the concentration falls to the predetermined value and to stop injecting fuel when the concentration rises to the predetermined value. A flammability detection system includes the detector and a controller that produces an annunciating signal when the fuel/air mixture concentration is equal to or between the upper and lower limits of the flammability range.

20 Claims, 2 Drawing Sheets ered by reference character 10. The fuel ignition arrester

FUEL IGNITION ARRESTER SYSTEM AND METHOD

This application is a continuation-in-part of U.S. application Ser. No. 09/084,528, filed May 26, 1998 for Fuel Ignition Arrester System and Method now abandoned.

FIELD OF INVENTION

This invention relates to a system and method for providing detection of and protection from ignition and explosion hazards of fuel. In particular, the invention concerns a system and method which arrests fuel ignition in a fuel tank disposed in a vehicle such as an airplane or in a stationary environment. The system includes a novel apparatus and method that detects flammability of fuel vapor in the tank ullage.

BACKGROUND OF INVENTION

A fuel tank has a fuel containing region and an ullage region. The ullage region contains a gas that comprises a fuel/air mixture. In order for the mixture to burn it is necessary to have certain proportions or concentrations of fuel to air (or oxygen). Those concentrations that support burning or combustion fall within a flammability range.

When the fuel particles are so widely separated that those set on fire by ignition will not set fire to others that are nearer, the mixture is called too lean for combustion and will not burn. When the particles are so close together that they exclude the oxygen necessary for combustion, the mixture is called too rich and will not burn. A flammability or combustion supporting range for a fuel/air mixture is defined by a lower limit concentration (or percent of fuel by volume) below which the mixture is incombustible and an upper limit concentration above which the mixture is incombustible.

The lower limit represents the minimum concentration that will ignite and burn, while the upper limit represents the maximum concentration that supports combustion. The generally accepted flammability range by volume for jet A turbine fuels is from about 0.74 to 5.32%. Jet B turbine fuels have a flammability range from about 1.16 to 7.63%. Most types of gasoline have a flammability range from about 1.4 to 7.6%.

There are a number of circumstances that can cause drastic changes in concentration that result in fuel/air mixture in the ullage region of a fuel tank to enter the hazardous flammability range such that a hot point or electrostatic spark could ignite the mixture thereby leading to a tank fire or explosion. These circumstances include a fuel consumption that removes fuel from the tank, a descent in altitude, entry of air into the tank or a fast reduction in tank ullage pressure after take off when the aircraft reaches high altitude in a short time, with the fuel still at the ambient ground temperature on a hot day (for example, 98° F.).

Prior art systems, exemplified by U.S. Pat. Nos. 3,628,758, 3,229,446 and 3,788,039, have used a fuel ignition arrester system which injects an inert gas, such as nitrogen, in sufficient amounts into the tank ullage to keep the fuel/air concentration below the lower limit of the flammability range. This system requires nitrogen storage or generation equipment that is expensive to install on an aircraft, is heavy and also is hazardous.

The present invention is generally directed to providing novel and improved systems and methods for flammability detection and fuel ignition arrest. The novel system is inexpensive, light weight and less hazardous than the prior art inert gas systems. The unique fuel ignition arrester system and method of the present invention maintains the fuel air mixture in the tank ullage above the flammability range.

SUMMARY OF INVENTION

A fuel ignition arrester system according to the present invention comprises a fuel tank and a control means that maintains the concentration of the fuel/air mixture in the tank ullage above the flammability range. The control means includes a detector that signals when the concentration rises to and falls to a predetermined concentration value that is higher than the upper limit of the flammability range. The control means further includes a fuel injector that is operable when the fuel/air mixture concentration falls to the predetermined value to inject fuel into the tank ullage at least until the concentration rises to the predetermined value such that the mixture is maintained incombustible.

The fuel injector has a fuel transfer means that transfers fuel from the fuel containing region of the tank and a fuel distributor that injects the transferred fuel as a spray into the ullage.

The method of the present invention detects when the fuel/air mixture concentration rises and falls to the predetermined value. When the concentration falls to the predetermined value, the method increases the fuel content of the mixture at least until the concentration rises to the predetermined value.

A novel fuel vapor or fuel to air mixture flammability detection apparatus according to the invention includes a detector that senses the concentration of the fuel/air mixture in the fuel tank ullage and a controller that produces an output signal when the concentration corresponds to at least one limit of the flammability range of the fuel. The output signal is usable to either control fuel ignition arrest, annunciation of a danger condition or for other purposes.

In an alternative embodiment of the present invention the output signal is produced when the concentration corresponds to either the upper or the lower limit of the flammability range.

The method of detecting flammability of a fuel/air mixture in a tank ullage includes sensing the concentration of the mixture and providing a concentration signal proportional to the concentration. The concentration signal is compared to the upper and lower limits of the flammability range. An output signal is produced when the concentration corresponds to either of the upper and lower limits to signify that the fuel/air mixture is combustible.

BRIEF DESCRIPTION OF DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
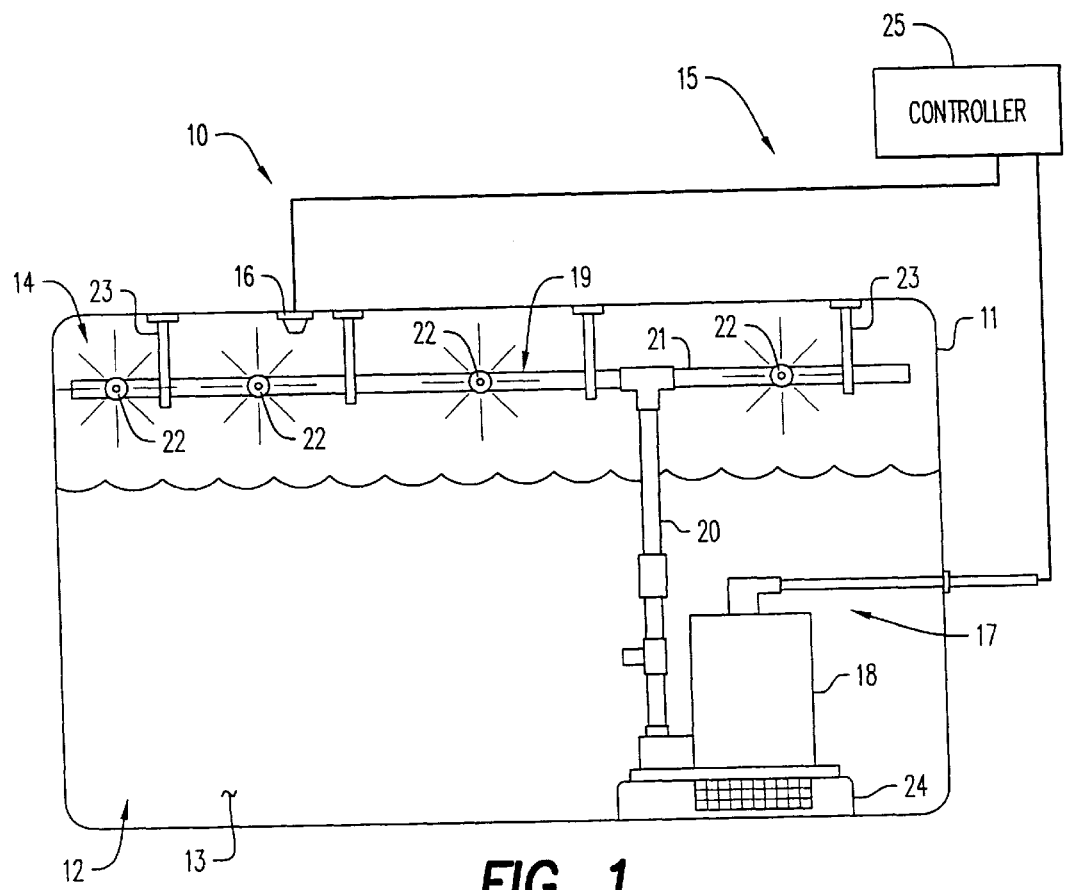
FIG. 1 is an elevation view of a fuel ignition arrester system of the present invention.

With reference to FIG. 1, there is provided a fuel arrester system according to the present invention, generally represented by numeral 10. Fuel arrester system 10 may be used to arrest fuel ignition in fuel tanks of all types including those in stationary environments as well as those in moving environments, such as aircraft or ground vehicles. By way of example and completeness of description, the fuel ignition arrester system of the invention will be described herein in reference to a fuel tank for an aircraft.

Fuel ignition arrester system 10 has a fuel tank 11 that has a region 12 that contains fuel 13 and an ullage region 14. Ullage region 14 contains a fuel/air mixture that has a flammability range defined by upper and lower limits of fuel to air concentration. When the fuel/air concentration is between the upper and lower limits, the mixture is within the flammability range and subject to ignition by a spark or any hot condition that causes burning. Any such ignition can lead to an explosion which can result in a disaster to the aircraft.

The fuel ignition arrester system 10 of the present invention includes a control means 15 which is operable to maintain the concentration of the fuel/air mixture above the upper limit of concentration so that the fuel/air mixture is outside the flammability range and incombustible. Control means 15 includes a detector 16 located within ullage region 14, a fuel injector 17 and a controller 25.

Fuel tank 11, detector 16 and controller 25 comprise a novel fuel vapor or fuel/air mixture flammability detection apparatus according to the present invention. Detector 16 senses the concentration of the fuel/air mixture. Controller 25 operates to produce an output signal signifying that the fuel/air mixture is combustible when the concentration corresponds to the range between the lower limit and the upper limit of the flammability range.

Detector 16 is arranged to signal when the fuel/air mixture concentration rises and falls to a predetermined value that is higher than the upper limit of the flammability range. By selecting the predetermined value to be higher than the upper limit, the fuel/air mixture will always be above the flammability range and, therefore, incombustible. In a preferred embodiment, the predetermined value is selected to be twice the upper limit. For jet A fuel, the predetermined value is set at about 10.65%. Detector 16 changes its output signal level in response to the fuel/air mixture concentration falling to and rising to the predetermined value.

Figure 3:
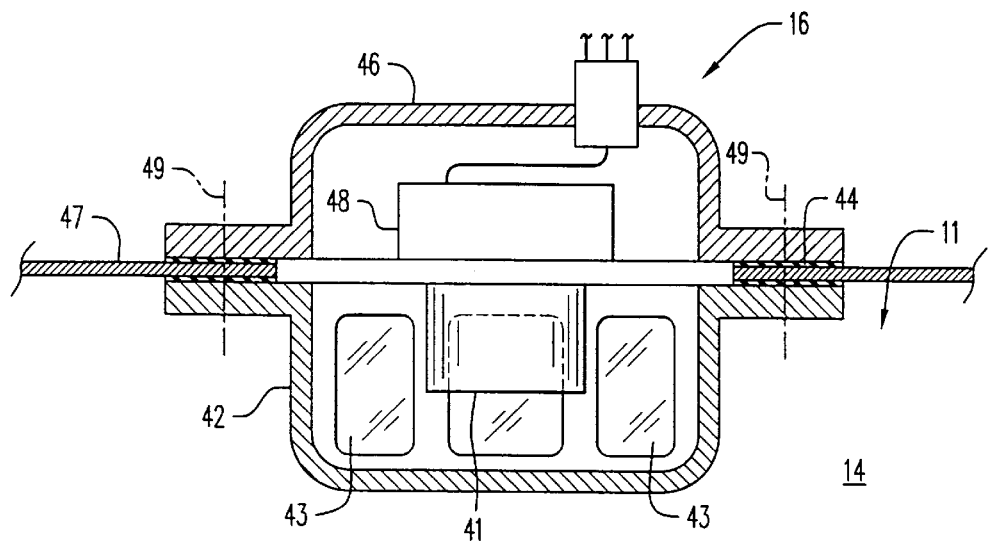
FIG. 3 is a cross sectional view of the photoelectric detector of FIG. 1.

An exemplary design of detector 16 is illustrated in FIG. 3. Detector 16 has an optical sensing chamber 41 that contains a photoelectric element and associated light source that operate on a light scattering principle. In a typical design, optical sensing chamber 41 is calibrated to a sensitivity of 1.5% to 15% fuel/air mixture obscuration.

Optical sensing chamber 41 is contained in a detector housing 42 that is sealed by gaskets 44 to the skin 47 of fuel tank 11. Light windows 43 are mounted on a side of detector housing 42. Light windows 43 are covered with translucent fuel resistant panes sealed as by gaskets into detector housing 42. Neither the panes nor the gaskets are shown in the drawing. Optical sensing chamber 41 emits light from windows 43 into the tank ullage region 14 and detects via these windows the fuel/air mixture obscuration. An access and seal cover 46 is mounted via a mounting plate 40 and gaskets 44 to the fuel tank skin 47 by screws 49 illustrated as dash-dot-dash lines. A relay and relay housing 48 is situated in access and seal cover 46 to cooperate with optical sensing chamber 41. Relay and relay housing 48 is coupled to an electrical connector for receiving operating power from and sending the detector output signal to controller 25.

Detector 16 may also use other devices such as a photoelectric reflex type operating with a visible red light beam or photoelectric fiber optic type operating with an infrared light source or of the infrared point type. In general, these devices measure opacity or light absorption of the ullage atmosphere and provide an output signal that is proportional to the fuel vapor concentration or content in the ullage.

Controller 25 includes a power line switch (not shown on the drawings) that is responsive to detector 16 signaling that the fuel/air concentration has fallen to the predetermined value to cause fuel injector 17 to inject fuel into ullage region 14 at least until such time that detector 16 signals that the concentration has risen to the predetermined value, thereby turning the power switch off. Controller 25 may also include appropriate cockpit panel displays (not shown on the drawing) to inform the flying crew of the fuel ignition arrester system status and/or controls to control the system.

Fuel injector 17 includes a fuel transfer means in the form of a fuel pump 18, a high pressure discharge pipe 20, distribution piping 21 and nozzles 22. Fuel pump 18, which is located in fuel containing region 12, turns on in response to the fuel/air mixture falling to the predetermined value to pump fuel via a fuel inlet 24 from fuel containing region 12 into ullage region 14. Fuel pump 18 remains on at least until the fuel/air mixture concentration rises to the predetermined value.

High pressure discharge pipe 20 extends from fuel containing region 12 into ullage region 14 to feed a fuel distributor 19. Fuel distributor 19 includes a distribution piping 21. Distribution piping 21 is suspended in ullage region 14 by piping supports 23. Fuel distributor 19 includes nozzles 22 are arranged along distribution piping 21 to inject fuel throughout ullage region 14. Preferably, nozzles 22 are of the spray type which spray fuel in a mist.

Figure 2:
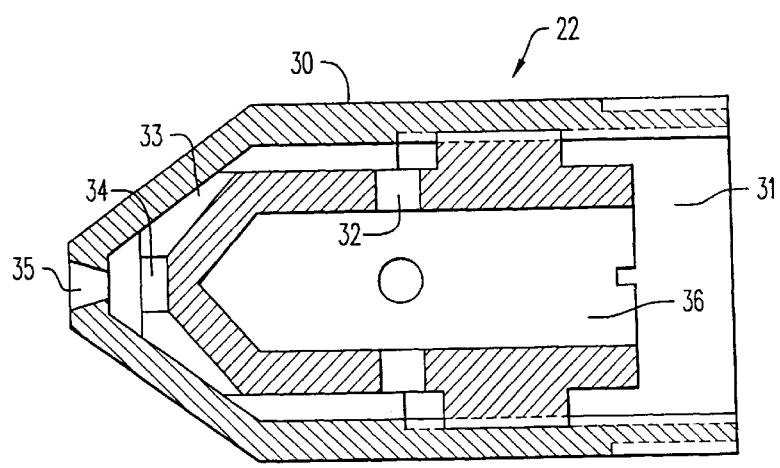
FIG. 2 is a cross-sectional view of the fuel nozzle in FIG. 1.

The fuel nozzles can be of any type which receives fuel under pressure and delivers a spray or mist. By way of example, one nozzle 22 that can be used is shown in FIG. 2. Nozzle 22 has a body 30 with a fuel inlet 31 for receiving fuel from distribution piping 21 (FIG. 1). Fuel inlet 31 feeds fuel into an interior chamber 36. Fuel is transferred from chamber 36 via fuel transfer ports 32 and a tangential slot 33 to a whirl chamber 34. The fuel is broken up into a fine spray in whirl chamber 34. Fuel exits whirl chamber 34 and through orifice 35 into the tank ullage region 14. Orifice 35 is formed in body 30 with a contour to allow a spray of considerable angle. For example, the orifice angle can be on the order of 80°.

Fuel pump 18 is preferably an aircraft fuel pump of the vane type that provides a supply pressure of 70 to 100 pounds per square inch gauge (psig) at the required delivery rate for the fuel of interest. For example, the required delivery rate for fuel pump 18 for jet A fuel can be calculated as follows:

SDR—Spray delivery rate in pound per hour (LP/HR)

EFC—Engine fuel consumption in LP/HR

VUL—Ullage volume increase in cubic feet per hour (CUF/HR)

VFL—Volume of fuel vapor corresponding to two times the upper flammability limit in CUF. For jet a fuel with an upper flammability limit of 5.32% of fuel vapor to air by volume, VFL will be 10.65% of the ullage volume.

WFL—Weight of fuel vapor per cubic foot of air (ullage) at twice the upper flammability limit in pound per cubic foot (LB/CUF)

The spray delivery rate SDR is given by the following equation:

SDR=VUL×WFL

For jet A fuel, the stoichiometric air/fuel ratio by volume is approximately 59.5 CUF of air to one CUF of fuel vapor. This produces a volumetric ratio of 1.7% of fuel vapor volume to air volume. The stoichiometric weight ratio is 15.1 pounds of air to one pound of fuel.

WFL=59.5 CUF×0.076 (weight of air)×(0.1065/15.1 LB)×0.017=1.876 LB/CUF.

The above calculation indicates that in order to maintain the tank ullage at twice the upper limit of flammability, the system needs to maintain a fuel vapor concentration that corresponds to 1.867 pound of fuel per cubic foot of ullage volume.

Assuming a jet aircraft that has a combined engine consumption from one fuel tank of 20,000 LB/HR, VUL=20,000/Average specific weight of jet A fuel=20,000/50=400 CUF/HR SDR=400×1.876=750 LB/HR at 90 psig.

A similar calculation can be performed for other fuel types.

The ignition arresting method of the present invention comprises detecting when the concentration of the fuel/air mixture rises and falls to the predetermined value and, when the concentration falls to the predetermined value, increasing the fuel content of the fuel/air mixture at least until said concentration rises to the predetermined value so as to maintain the mixture above the flammability range and, thus, safe from accidental burning and/or explosion events.

Figure 4:
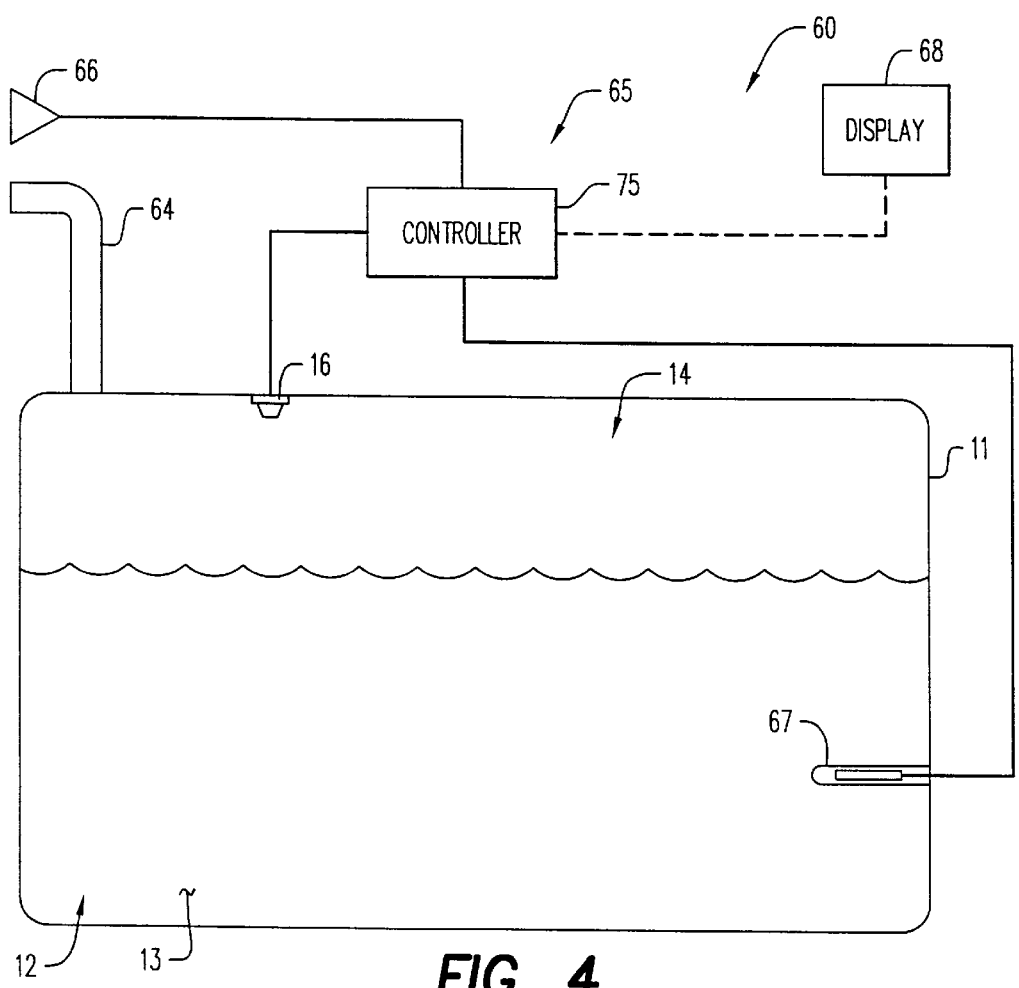
FIG. 4 is an elevation view of a flammability detection apparatus of the invention.

Referring now to FIG. 4, there is provided an alternative embodiment of a fuel vapor flammability detection system according to the invention, generally designated by numeral 60. Flammability detection system 60 may be used with fuel ignition arrester system 10 or separately as a stand alone installation. Parts that are common to both systems are identified by the same reference numerals.

Flammability detection system 60 includes fuel tank 11 that has region 12 containing fuel 13 and ullage region 14 containing a fuel/air mixture that has a flammability range defined by upper (first) and lower (second) limits of fuel to air concentration. A vent 64 is provided to vent ullage region 14 to atmosphere.

The flammability detection system 10 of the present invention includes a control means 65 which is operable to detect and signal that the concentration of the fuel/air mixture equals the upper or the lower limit or is within the flammability range and, therefore, combustible. Control means 65 includes detector (sensor) 16 located within ullage region 14, a barometric pressure sensor 66, a temperature sensor 67, a controller 75 and a display 68.

Sensor 16 is arranged to monitor the fuel/air mixture concentration and provide to controller 75 a concentration signal having a signal characteristic, for example, amplitude, that is proportional to the fuel/air mixture concentration. Pressure sensor 66 is arranged to monitor barometric ambient pressure and provide to controller 75 a pressure signal having a signal characteristic, for example, amplitude, that is proportional to barometric ambient pressure. Temperature sensor 67 is arranged in fuel containing region 12 to provide to controller 75 a temperature signal having a signal characteristic, for example, amplitude, proportional to the temperature of fuel 13.

Controller 75 may be implemented with either digital or analog components. A suitable digital implementation includes analog to digital conversion means and a signal processor. The analog to digital conversion means converts the concentration signal, the pressure signal and the temperature signal to digital form. The microprocessor processes these signals to provide an output annunciation signal signifying that the concentration signal has an amplitude value that equals or is between the first or the second limit. The output annunciation signal is supplied to display 68 that is arranged to display a danger or alert condition. Display 68 may be located in the cockpit of the aircraft in which flammability detection system is installed. The annunciation signal may also be used to annunciate the danger condition aurally by means not shown.

The pressure signal output of pressure sensor 66 is used to adjust the lower and upper limits of the flammability range as the pressure (altitude) varies. The temperature signal output of sensor 67 is used by controller 75 to correlate the fuel/air mixture level as detected by detector 16 to the actual fuel temperature. For example, the lower flammability limit of Jet A fuel drops in concentration corresponding to 1° F. for every 800 feet of altitude increase. The upper flammability limit drops 1.33° F. for every 800 feet of altitude increase. Thus, for an increase of 8,000 feet in altitude from ground level, the lower flammability limit will drop from 0.74% to 0.65% and correspond to 90° F. and the upper flammability limit will drop from 5.32% to 4.4% and correspond to 152° F. of actual fuel temperature.

When flammability detection system 60 is used in a fuel arrester system, controller 75 is operable to produce on output lead 70 a signal corresponding to the fuel/air concentration falling to and/or rising to the predetermined value. This signal can be used to operate fuel injector 17 to increase the fuel content of the fuel/air mixture at least until said concentration rises to the predetermined value so as to maintain the mixture above the flammability range and, thus, safe from accidental burning and/or explosion events.

When flammability detection system 60 is installed in an aircraft center fuel tank, for example, and a flammability condition is detected prior to take off, mitigating action could be initiated to remove the flammability condition. These mitigating actions may include, for example, filling the fuel tank to the top, adding cold fuel to the tank in order to reduce its temperature, shutting off heat producing sources that affect the temperature of the tank.

During flight, if sensor 16 indicates the fuel/air mixture is in the flammability range with the fuel temperature below the flash point (a condition that could result from uncontrolled spray from a leaking fuel system component), corrective action could be taken by the aircraft crew.

Flammability detection system 60 could be used as the control system for fuel tank inerting systems that use nitrogen injection, fuel scrubbing or ullage washing techniques. In such applications, flammability detection system 60 will control system operation and monitor tank ullage flammability conditions resulting from system operation in a closed feedback control loop. Flammability detection system 60 can be similarly used to monitor ground based fuel tanks, provide flammability condition alarm and activate suppression systems.

Flammability detection system 60 can also be used to investigate and research the flammability conditions in aircraft fuel tanks during the flight cycle by adding a recording device to the annunciator and control panel and record inerting results obtained from the use of various tank inerting systems.

The flammability detecting method of the present invention comprises sensing the concentration of the fuel/air mixture in the ullage of a fuel tank and producing a concentration signal proportional to the concentration. The concentration signal is compared to the upper and lower limits of the flammability range. An output signal signifying flammability of the fuel/air mixture is produced when the concentration corresponds to either of the upper and lower limits. The output signal may be used to annunciate a danger condition so that mitigating action may be taken to avoid accidental burning and/or explosion events.

The present invention having been thus described with particular reference to the preferred forms thereof, it will be obvious that various changes and modifications may be made therein without departing from the spirit and scope of the present invention as defined in the appended claims.

What is claimed is:

1. An aircraft fuel ignition arrester system comprising:
a fuel tank having a fuel region containing fuel and an ullage region containing a fuel/air mixture having a flammability range, said flammability range having an upper limit of fuel to air concentration above which said fuel/air mixture is incombustible; and
control means for maintaining said concentration equal to or above a predetermined value that is higher than said upper limit by increasing the fuel content of said fuel/air mixture in response to said concentration falling equal to or below said predetermined value, whereby said fuel/air mixture is maintained above said upper limit so as to be incombustible, wherein said control means comprises:
a detector for signaling when said concentration rises and falls to said predetermined value; and
fuel injection means responsive to said signaling when said concentration falls to said predetermined value to inject fuel into said ullage region at least until said concentration rises to said predetermined value.

2. The system according to claim 1 wherein said fuel injection means comprises:
fuel transfer means for transferring fuel from said fuel containing region; and
a fuel distributor for injecting said transferred fuel as a spray into said ullage region to increase said concentration at least until it rises to said predetermined value.

3. The system according to claim 2 wherein said fuel distributor comprises at least one spray nozzle for spraying said transferred fuel into said ullage region.

4. The system according to claim 3 wherein said fuel transfer means is a fuel pump that pumps said transferred fuel and wherein said fuel distributor further comprises a fuel delivery means for delivering said transferred fuel from said pump to said at least one nozzle.

5. The system according to claim 4 wherein said at least one nozzle is one of a plurality of nozzles and said delivery means delivers said transferred fuel to said plurality of nozzles.

6. The system according to claim 1 wherein said detector comprises a photoelectric sensor and light source arranged to monitor said fuel/air mixture to provide said signaling.

7. A method of arresting ignition in an aircraft fuel tank, said fuel tank having a fuel region containing fuel and an ullage region containing a fuel/air mixture having a flammability range, said flammability range having an upper limit of fuel to air concentration above which said fuel/air mixture is incombustible; said method comprising:
detecting when said concentration rises and falls to a predetermined value that is higher than said upper limit;
increasing the fuel content of said fuel/air mixture when said concentration falls to said predetermined value, whereby said fuel/air mixture is maintained above said upper limit so as to be incombustible.

8. The method according to claim 7 wherein said fuel content is increased at least until said concentration rises to said predetermined value.

9. A fuel flammability detection apparatus comprising:
an aircraft fuel tank having a fuel region containing fuel and an ullage region containing a fuel/air mixture having a flammability range within which said mixture is combustible, said flammability range being defined by first and second limits of fuel to air concentration;
a concentration detector for providing a concentration signal having an amplitude proportional to said fuel to air concentration; and
control means responsive to said concentration signal for providing a first output signal signaling that said fuel to air concentration is equal to one of said limits.

10. The fuel flammability detection apparatus according to claim 9 wherein said first output signal signals that said fuel to air concentration is equal to either of said limits.

11. The fuel flammability detection apparatus according to claim 10 wherein there is provided a pressure detector for providing a pressure signal proportional to barometric pressure; and
wherein said control means responds to said pressure signal to change said flammability range limits as said barometric pressure changes.

12. The fuel flammability detection apparatus according to claim 11 wherein said second limit is an upper limit of said flammability range; and
wherein said control means includes means responsive to said first output signal for maintaining said concentration equal to or above a predetermined value that is higher than said upper limit by increasing the fuel content of said fuel/air mixture in response to said concentration falling equal to or below said predetermined value, whereby said fuel/air mixture is maintained above said upper limit so as to be incombustible.

13. The fuel flammability detection apparatus according to claim 11 wherein said control means includes means responsive to said first output signal for annunciating that said concentration is equal to one of said limits or is within said flammability range.

14. A method for detecting flammability of fuel/air mixture in the ullage of an aircraft fuel tank, said method comprising:
sensing a fuel to air concentration of said mixture and providing a concentration signal proportional to said concentration;
comparing said concentration signal to one of first and second limits that define a flammability range of said fuel mixture; and
producing an output signal signifying said flammability when said concentration signal corresponds to said one limit.

15. The method according to claim 14 wherein said concentration signal is compared to both said first and second limits; and
wherein said output signal is produced when said concentration signal corresponds to either of said limits.

16. The method according to claim 15 wherein said method further includes annunciating an alert in response to said output signal.

17. The method according to claim 14 wherein said one limit is the upper limit of said range; and
wherein said method further includes increasing the fuel content of said fuel/air mixture when said concentration corresponds to said upper limit whereby said fuel/air mixture is maintained above said upper limit so as to be incombustible.

18. The method of claim 15 and further comprising:

sensing the barometric ambient pressure and providing a pressure signal proportional to said barometric ambient pressure; and adjusting said first and second limits of said flammability range in accordance with changes in said pressure signal.

19. The fuel flammability detection apparatus according to claim 11, wherein there is provided a temperature detector for providing a temperature signal proportional to the temperature of the fuel; and wherein the control means responds to the temperature signal to correlate the concentration signal with the temperature of the fuel.

20. The fuel flammability detection apparatus according to claim 11, wherein the ullage region contains a vent to atmosphere, whereby the ullage region is at atmospheric pressure.

* * * * *